United States Patent
Cheng et al.

(10) Patent No.: US 10,663,977 B2
(45) Date of Patent: May 26, 2020

(54) METHOD FOR DYNAMICALLY QUERYING A REMOTE OPERATOR FOR ASSISTANCE

(71) Applicant: Direct Current Capital LLC, Wilmington, DE (US)

(72) Inventors: Tim Cheng, Mountain View, CA (US); Kah Seng Tay, Mountain View, CA (US)

(*) Notice: Subject to any disclaimer, the term of this patent is extended or adjusted under 35 U.S.C. 154(b) by 0 days.

(21) Appl. No.: 16/400,866

(22) Filed: May 1, 2019

(65) Prior Publication Data
US 2019/0354111 A1    Nov. 21, 2019

Related U.S. Application Data

(60) Provisional application No. 62/672,557, filed on May 16, 2018.

(51) Int. Cl.
| | |
|---|---|
| *G05D 1/02* | (2020.01) |
| *H04W 4/40* | (2018.01) |
| *G05D 1/00* | (2006.01) |
| *H04W 84/04* | (2009.01) |

(52) U.S. Cl.
CPC ......... *G05D 1/0285* (2013.01); *G05D 1/0011* (2013.01); *G05D 1/0088* (2013.01); *H04W 4/40* (2018.02); *G05D 2201/0213* (2013.01); *H04W 84/042* (2013.01)

(58) Field of Classification Search
CPC .. G05D 1/0285; G05D 1/0011; G05D 1/0088; G05D 2201/0213; H04W 4/40; H04W 84/042
USPC ......................................................... 701/23
See application file for complete search history.

(56) References Cited

U.S. PATENT DOCUMENTS

| | | | |
|---|---|---|---|
| 9,725,171 B1* | 8/2017 | Carmack | B64C 39/024 |
| 2016/0229404 A1 | 8/2016 | Byun | |
| 2016/0231746 A1 | 8/2016 | Hazelton et al. | |
| 2017/0123429 A1 | 5/2017 | Levinson et al. | |
| 2019/0137287 A1* | 5/2019 | Pazhayampallil | G01C 21/32 |
| 2019/0196481 A1* | 6/2019 | Tay | G05D 1/0214 |

* cited by examiner

*Primary Examiner* — Gertrude Arthur Jeanglaude
(74) *Attorney, Agent, or Firm* — Polsinelli PC

(57) ABSTRACT

One variation of a method for dynamically querying a remote operator for assistance includes, at an autonomous vehicle: autonomously navigating along a roadway; at locations along the roadway, testing performance of a set of wireless networks; in response to degradation of the set of wireless networks, decreasing a sensitivity threshold for triggering remote operator events at the autonomous vehicle; in response to a condition at the autonomous vehicle exceeding the sensitivity threshold at a particular location along the roadway, triggering a remote operator event; during the remote operator event, transmitting sensor data to a remote computer system via a subset of wireless networks, in the set of wireless networks, based on performance of the set of wireless networks proximal the particular location; and executing a navigational command received from a remote operator via a wireless network in the set of wireless networks.

27 Claims, 4 Drawing Sheets

METHOD FOR DYNAMICALLY QUERYING A REMOTE OPERATOR FOR ASSISTANCE

CROSS-REFERENCE TO RELATED APPLICATIONS

This Application claims the benefit of U.S. Provisional Application No. 62/672,557, filed on 16 May 2018, which is incorporated in its entirety by this reference.

TECHNICAL FIELD

This invention relates generally to the field of autonomous vehicles and more specifically to a new and useful method for dynamically querying a remote operator for assistance in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
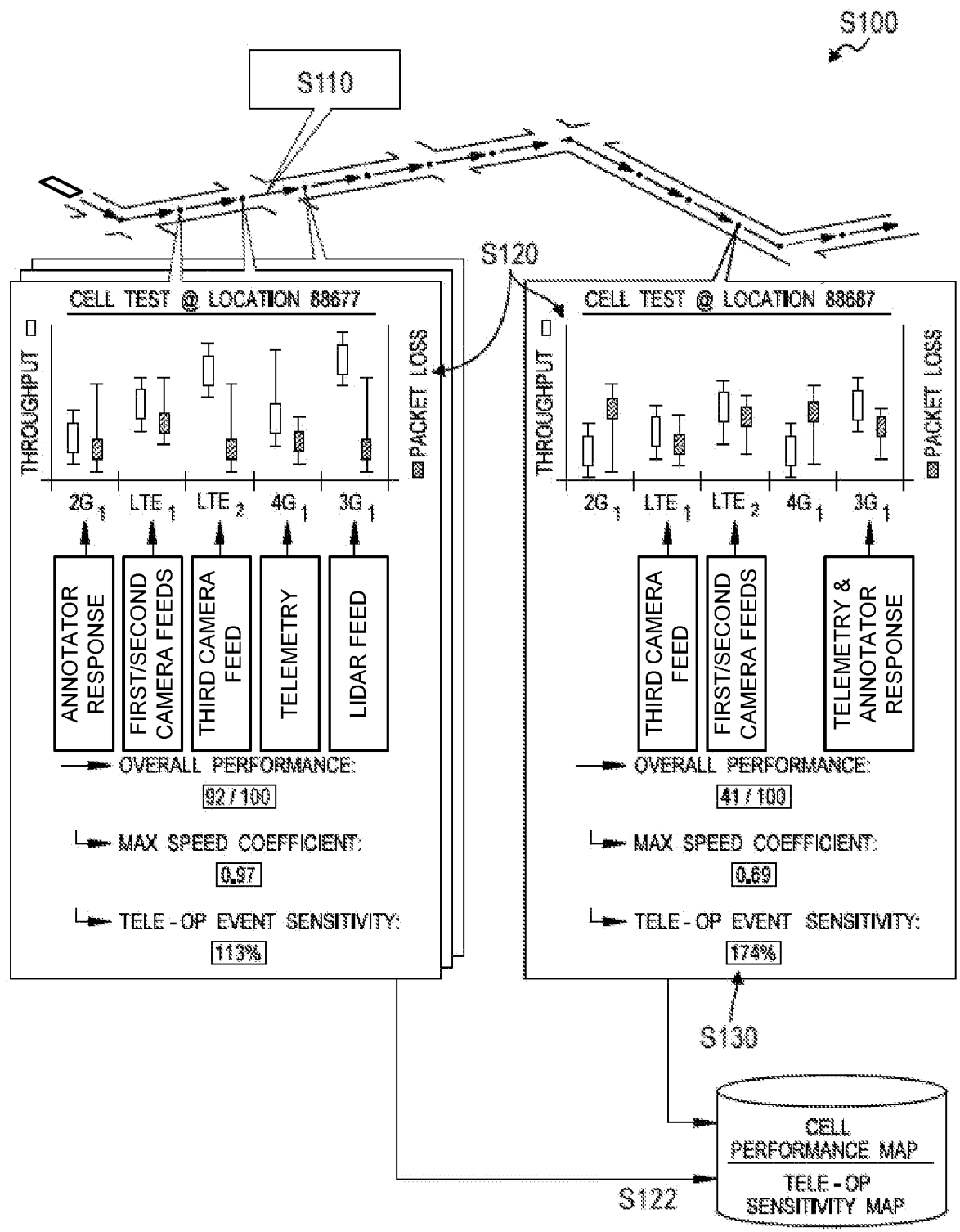
FIG. 1 is a flowchart representation of a method.
Figure 2:
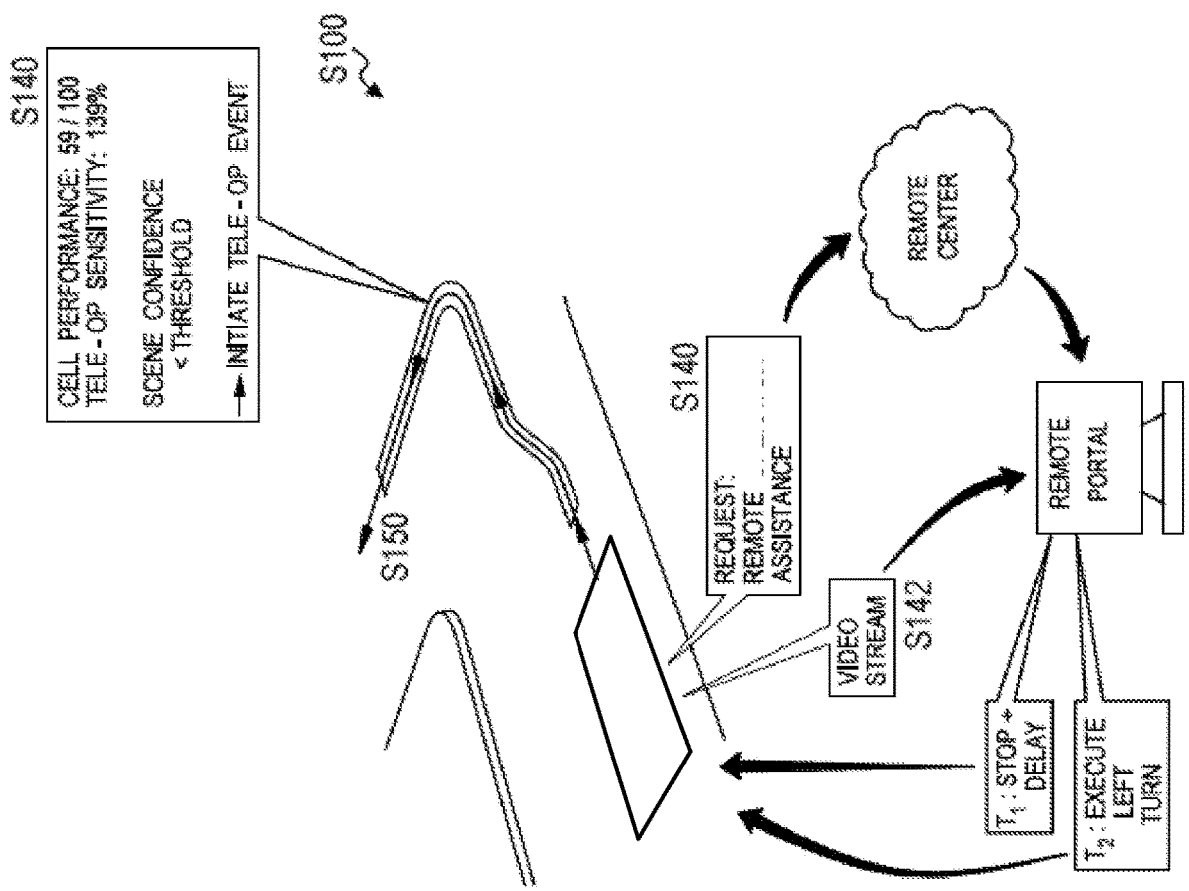
FIG. 2 is a flowchart representation of one variation of the method.

As shown in FIGS. 1 and 2, a method S100 for dynamically querying a remote operator for assistance includes, at an autonomous vehicle: autonomously navigating along a roadway in Block S110; at locations along the roadway, testing performance of a set of wireless networks in Block S120; in response to degradation of the set of wireless networks, decreasing a sensitivity threshold for triggering remote operator events at the autonomous vehicle in Block S130; in response to a condition at the autonomous vehicle exceeding the sensitivity threshold at a particular location along the roadway, triggering a remote operator event in Block S140; during the remote operator event, transmitting sensor data to a remote computer system via a subset of wireless networks, in the set of wireless networks, based on performance of the set of wireless networks proximal the particular location in Block S142; and executing a navigational command received from a remote operator via a wireless network in the set of wireless networks in Block S150.

Figure 3:
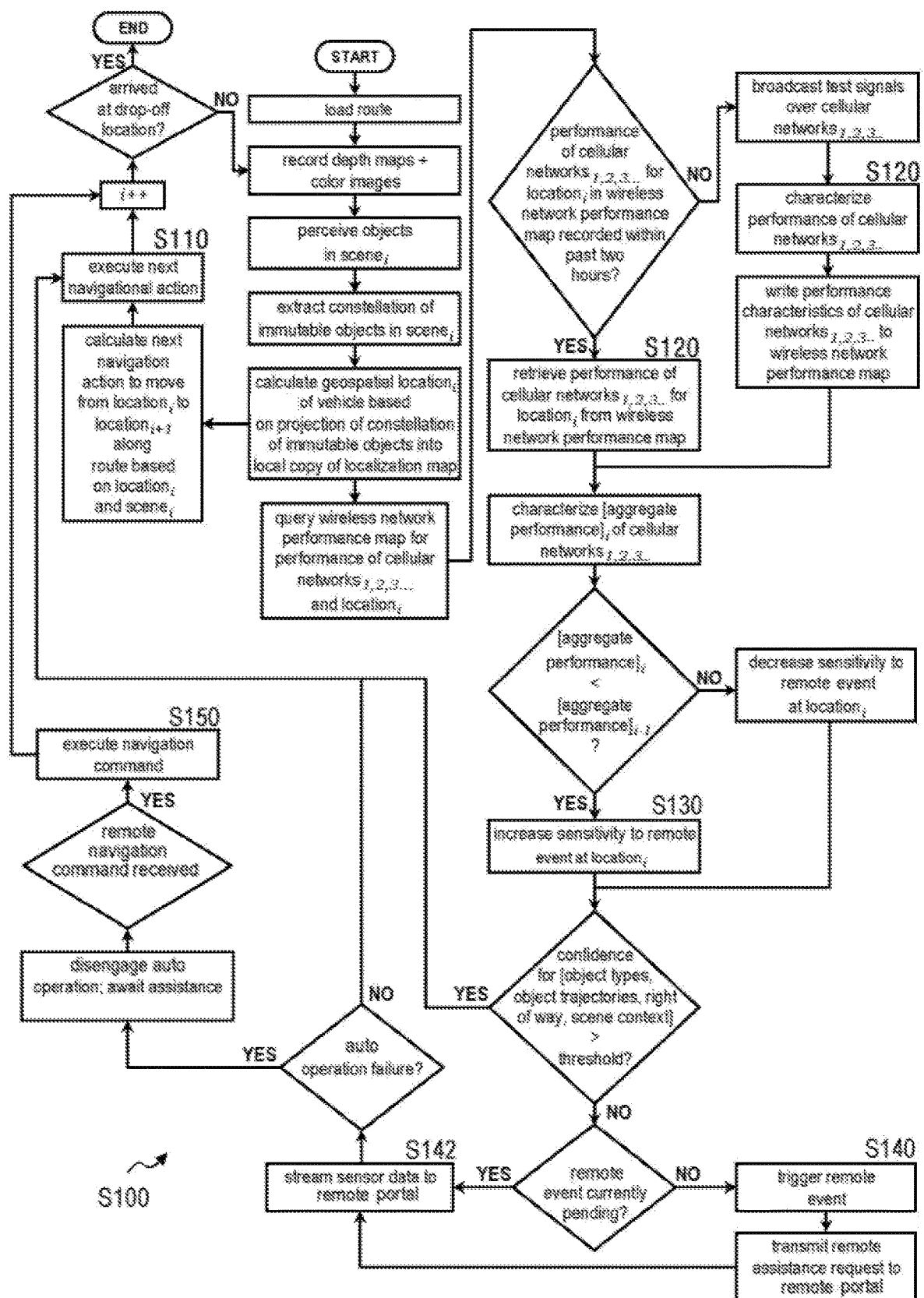
FIG. 3 is a flowchart representation of one variation of the method.

One variation of the method S100 shown in FIG. 3 includes: autonomously navigating along a roadway within a geographic region in Block S100; accessing a wireless network performance map representing historical performance characteristics of a set of wireless networks within the geographic region; adjusting a sensitivity threshold for triggering remote operator events at the autonomous vehicle along the roadway as a function of historical performance characteristics of the set of wireless networks, represented in the wireless network performance map, proximal the roadway in Block S130; in response to a condition at the autonomous vehicle exceeding the sensitivity threshold at a particular location along the roadway, triggering a remote operator event in Block S140; during the remote operator event, transmitting sensor data to a remote computer system via a subset of wireless networks, in the set of wireless networks, based on performance of the set of wireless networks proximal the particular location in Block S142; and executing a navigational command received from a remote operator via a wireless network in the set of wireless networks in Block S150.

Another variation of the method S100 includes: autonomously navigating along a roadway in Block S110; at locations along the roadway, testing performance of a set of wireless networks in Block S120; updating a wireless network performance map representing historical performance characteristics of the set of wireless networks based on wireless network performance test results at locations along the roadway in Block S22; in response to a remote operator event at the autonomous vehicle, transmitting sensor data to a remote computer system via a subset of wireless networks, in the set of wireless networks, based on wireless network performances predicted in the wireless network performance map in Block S142; and executing a navigational command received from a remote operator via a wireless network in the set of wireless networks in Block S150.

2. Applications

Blocks of the method S100 can be executed by an autonomous vehicle to dynamically adjust sensitivity for triggering requests for a remote human operator to assist the autonomous vehicle—such as by confirming or electing a next navigational action of the autonomous vehicle or by assuming remote manual control of the autonomous vehicle—based on performance characteristics of local wireless networks. In particular, the autonomous vehicle can include a suite of cellular antennas configured to transmit and receive data over various cellular networks (e.g., CDMA and GSM cellular networks).

For example, as the latency, throughput, packet loss, and/or signal strength of various cellular networks accessible to the autonomous vehicle vary over time and/or as the autonomous vehicle navigates within a geographic region, the autonomous vehicle can increase sensitivity (e.g., reduce a threshold) for triggering a remote operator to assist the autonomous vehicle responsive to degradation of local cellular network performance, thereby providing remote operators with preemptive sensor data from the autonomous vehicle, enabling remote operators to timely comprehend the scene around autonomous vehicles despite access to lower-quality autonomous vehicle sensor data, and enabling remote operators to provide timely assistance to the autonomous vehicle despite this higher latency of communications with the autonomous vehicle. Conversely, the autonomous vehicle can decrease sensitivity (e.g., increase the threshold) for triggering a remote operator to assist the autonomous vehicle as cellular network performance increases, thereby leveraging increased cellular network performance to deliver higher-quality sensor data to remote operators with less latency while also reducing false negative remote operator events at the autonomous vehicle and total remote operator demand across autonomous vehicles in a fleet.

3. Example

Generally, an autonomous vehicle can: include a suite of sensors, such as LIDAR and 2D color cameras; regularly sample these sensors during autonomous operation; and implement artificial intelligence and computer vision techniques to perceive objects (e.g., vehicles, pedestrians, traffic signs, curbs, lane markers, etc.) and to extract a context from sensor data recorded by these sensors. From its perception of objects and context of the scene or environment around the autonomous vehicle, the autonomous vehicle can elect a next action, such as: maintaining a current trajectory, braking, accelerating, turning left, or turning right and magnitudes of these actions. The autonomous vehicle can regularly implement this process of reading data from sensors on the autonomous vehicle, perceiving objects and context from these sensor data, calculating a trajectory based on these objects and context, and modifying actuator positions (e.g., brake, accelerator, and steering angle positions)—such as at a rate of 10 Hz—in order to realize this trajectory.

During this process, the autonomous vehicle can calculate confidence scores for the autonomous vehicle's: identification of objects in the scene (e.g., whether an object represents a pedestrian or a fire hydrant); context of the scene (e.g., whether a pedestrian is occupying a crosswalk or whether the autonomous vehicle has right of way to enter an intersection); or viability of a trajectory calculated by the autonomous vehicle to maintain the autonomous vehicle along a preplanned path and/or to avoid collision with another object. The autonomous vehicle can continue to operate autonomously while its confidence in identification of nearby objects, its perception of the scene nearby, and its election of a next action exceed corresponding threshold confidences.

However, the autonomous vehicle may occasionally encounter scenes in which the autonomous vehicle is: unable to identify an object (in or near the autonomous vehicle's path) with sufficient confidence; perceive this scene (e.g., right of way through an intersection) with sufficient confidence; or elect a next action (e.g., an actuator position to navigate along a preplanned path or avoid a collision) with sufficient confidence. In these instances, the autonomous vehicle can automatically request assistance from a remote operator and upload (near) real-time sensor data—such as a depth map (or "LIDAR") feed and/or a color video feed via a cellular network—to a remote server, which can then distribute these sensor data to a remote operator portal. A human operator may then review these sensor data within the remote operator portal during this remote operator event and then elect a next navigational action for the autonomous vehicle (e.g., stop, go, turn), confirm a navigational action proposed by the autonomous vehicle, or assume remote manual control of the autonomous vehicle through the remote operator portal. The remote operator can then return a command or control value to the autonomous vehicle, and the autonomous vehicle can execute this command or implement this control value accordingly before resuming autonomous operation.

In particular, when requesting assistance from a remote operator, the autonomous vehicle uploads sensor data—such as a LIDAR feed and/or a color video feed—via a local cellular network to the remote server for subsequent distribution to an assigned remote operator portal. The human remote operator may then elect a next navigational action for the autonomous vehicle or assume remote manual control of the autonomous vehicle based on these sensor data. These sensor data may be both relatively dense and substantially necessary for the remote operator to accurately perceive the scene around the autonomous vehicle before responding to the autonomous vehicle's request for assistance. The autonomous vehicle may therefore require a local cellular network with relatively high bandwidth (or upload bandwidth more specifically, or throughput) and low packet loss in order to deliver these high-density sensor data to the remote server during a remote operator event. Similarly, the autonomous vehicle may require the remote operator to elect a next action or assume manual control of the autonomous vehicle relatively quickly (e.g., within seconds of receipt of the request from the autonomous vehicle) in order to avoid collision with an external object nearby and/or to support perception of seamless autonomous operation for a rider occupying the autonomous vehicle during this period. The autonomous vehicle may therefore require access to a local cellular network with relatively low latency in order to deliver these sensor data to the remote server quickly during a remote operator event.

Various cellular carriers may host multiple cellular networks throughout a geographic region, and these cellular networks may exhibit different qualities (e.g., latency, throughput, packet loss, signal strength) throughout this geographic region, such as as a function of location, time of day, and local demand or load. For example, individual cellular networks may exhibit strong performance characteristics (e.g., low latency, high throughput, low packet loss, high signal strength) in some areas within this geographic region, moderate performance in other areas, and poor performance in yet other areas and may exhibit no coverage in still other areas within the geographic region. Furthermore, performance of these cellular networks may change as a function of time of day, day of week, ambient temperature, local weather conditions, infrastructure outages, etc. Some areas within this geographic region may also be covered by public Wi-Fi networks, which may exhibit performance characteristics that similarly vary based on time, location, etc.

During autonomous operation, the autonomous vehicle can execute Blocks of the method S100 to regularly test local performance of various cellular networks (and/or public Wi-Fi networks, public mesh networks, etc.) and to modify sensitivity for triggering remote operator involvement in actions at the autonomous vehicle based on (e.g., inversely proportional to) local network performance. In particular, by increasing sensitivity to possible remote operator events (i.e., by reducing a threshold for prompting a remote operator to assist the autonomous vehicle) responsive to reduced performance of some or all cellular networks currently accessible to the autonomous vehicle, the autonomous vehicle can serve an initial request for remote operator assistance and upload sensor data to an assigned remote operator at a time that precedes a subsequent remote operator event by a duration that compensates for (e.g., inversely proportional to) these diminished network performance characteristics to better ensure that a minimum volume of sensor data has reached the remote operator by the time that guidance from the remote operator is imperative for the autonomous vehicle to function or avoid a collision.

For example, when the autonomous vehicle determines that multiple networks in the autonomous vehicle's current location exhibit high-throughput (or high bandwidth) and low-latency characteristics with less than 1% packet loss rate, the autonomous vehicle can set a low threshold (i.e., a low sensitivity) for triggering a remote operator event such that the autonomous vehicle continues autonomous operation as long as its confidence in perception of the scene nearby and/or validation of its trajectory exceeds this low threshold (e.g., 80% confidence). The autonomous vehicle can thus leverage these high-performance cellular network conditions in which sensor data transmitted by the autonomous vehicle via these local cellular networks during a remote operator event may be almost immediately visible—in high fidelity—within a remote operator portal and with minimal compression, thereby enabling the remote operator to comprehend a scene around the autonomous vehicle in (near) real-time and with a relatively high degree of accuracy and resolution.

However, as the autonomous vehicle moves into other areas in which these cellular networks exhibit decreased throughput, increased latency, or increased packet loss, sensor data transmitted by the autonomous vehicle via these local cellular networks during a remote operator event may be visible within a remote operator portal only after greater delay and in lower resolution formats (e.g., as a result of compression or packet loss prior to arrival at the remote operator portal), thereby introducing temporal error into sensor data viewed in the remote operator portal, reducing the resolution of these sensor data, increasing perception challenges for the remote operator, and/or increasing a time necessary for the remote operator to correctly perceive the scene around the autonomous vehicle from this sensor feed. Accordingly, the autonomous vehicle can increase the threshold (i.e., increase sensitivity) for triggering a remote operator event under these lower-network-performance conditions such that the autonomous vehicle continues autonomous operation only as long as its confidence in its current object recognition, perception, and/or trajectory validation exceeds this high(er) threshold (e.g., 90% confidence). The autonomous vehicle can thus ensure that sensor data are timely presented to a remote operator, thereby providing the remote operator sufficient time to accurately comprehend the scene around the autonomous vehicle from the sensor data and to return timely navigational assistance to the autonomous vehicle (i.e., when or before the autonomous vehicle's need for such assistance is imminent), even though presentation of these sensor data at the remote operator portal may be delayed and/or presented at lower resolution under these degraded cellular network performance conditions.

The autonomous vehicle can therefore implement Blocks of the method S100 to dynamically adjust sensitivity for triggering a remote operator event as an inverse function of performance of one or more local cellular networks in order to compensate for real-time latency and/or throughput limitations of these local cellular networks and to thus enable remote operators to provide timely, accurate assistance to the autonomous vehicle substantially regardless of these limitations.

The autonomous vehicle can additionally or alternatively elect to transmit sensor data to a remote operator portal via specific cellular networks—currently within range at the autonomous vehicle—during a remote operator event based on real-time local performance of these cellular networks. For example, during a remote operator event, the autonomous vehicle can: test local cellular networks; elect to upload a LIDAR feed to the remote server via a first, highest-throughput cellular network in the autonomous vehicle's current location; elect to upload a video feed to the remote server via a second cellular network that exhibits a best balance of high throughput and low latency in the autonomous vehicle's current location; and elect to receive a command or response from a remote operator via a third network exhibiting a lowest latency in the autonomous vehicle's current location, thereby matching value, density, and timeliness of data communicated between the autonomous vehicle and the remote operator portal to performance of cellular networks elected by the autonomous vehicle to carry these data. In another example, the autonomous vehicle can transmit identical high-priority data—such as a color video feed—over multiple cellular networks in order to improve a likelihood that these high-priority data will timely reach a remote operator.

Furthermore, in addition to adjusting a threshold for triggering a remote operator event based on measured, real-time local wireless network performance characteristics, the autonomous vehicle can query a wireless network performance map that depicts historical performance of various wireless networks within the geographic region in order to predict wireless network performance characteristics at future locations of the autonomous vehicle, such as at an upcoming intersection, at a position 50 meters ahead of the autonomous vehicle when traveling at a speed of 25 miles per hour, or at a position 200 meters ahead of the autonomous vehicle when traveling at a speed of 50 miles per hour. The autonomous vehicle can then preemptively adjust the threshold (or sensitivity) for triggering a remote operator event and/or preemptively elect and establish a wireless connection with a particular wireless network based on performance characteristics of available wireless networks predicted by the wireless network performance map at the autonomous vehicle's future location(s). The autonomous vehicle can also normalize or adjust a wireless network performance prediction for a future location of the autonomous vehicle output by the wireless network performance map based on differences between wireless network performance characteristics measured by the autonomous vehicle and predicted by the wireless network performance map for the autonomous vehicle's current location, and the autonomous vehicle (or a remote computer system) can update and refine the wireless network performance map based on timestamped, georeferenced wireless network performance characteristics measured by the autonomous vehicle during autonomous operation.

4. Autonomous Vehicle

The method S100 can be executed by an autonomous vehicle that includes: a suite of sensors configured to collect information about the autonomous vehicle's environment; local memory storing a navigation map defining lane connections and nominal vehicle paths for a road area and a localization map that the autonomous vehicle implements to determine its location in real space; and a controller. The controller can: calculate a nominal path between the autonomous vehicle's current location and a destination based on the navigation map; determine the location of the autonomous vehicle in real space over time based on sensor data collected from the suite of sensors and the localization map; determine the context of a scene around the autonomous vehicle based on these sensor data; elect a future action (e.g., a navigational decision) to remain on or deviate from the nominal path based on the context of the scene around the autonomous vehicle and the real geospatial location of the autonomous vehicle; and control actuators within the vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, left lateral, and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the vehicle, such as by passing the autonomous vehicle's position, identified dynamic objects in the local scene, and the autonomous vehicle's destination into a navigational model (e.g., a navigational neural network). The autonomous vehicle can therefore implement one or more neural networks locally to determine its location, perceive its surroundings, and select future actions in Block S110.

The autonomous vehicle can also include multiple network antennas, such as for CDMA and/or GSM cellular networks hosted by various cellular carriers and/or for LTE and other wireless broadband networks hosted within a geographic region (hereinafter "network antennas" and "cellular networks"). The autonomous vehicle can selectively upload sensor data to a remote server and download commands or remote manual controls from the remote server via these cellular networks.

5. Cellular Network Tests

Figure 4:
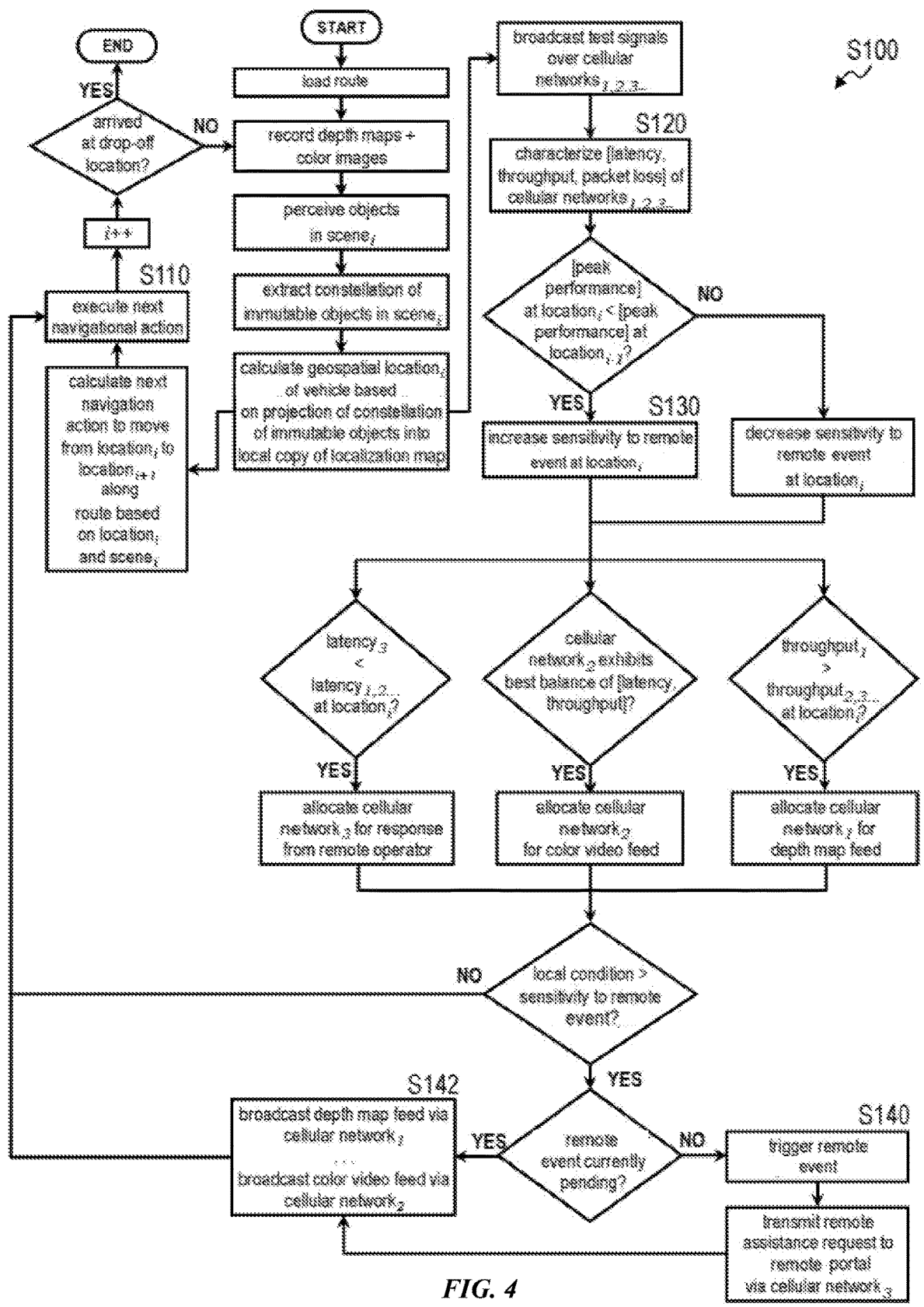
FIG. 4 is a flowchart representation of one variation of the method.

Block S120 of the method S100 recites, at locations along a roadway, testing performance of a set of cellular networks. Generally, in Block S120, the autonomous vehicle can regularly test performance (or "quality") of each of various cellular networks that are accessible to the autonomous vehicle while autonomously navigating along a preplanned path, as shown in FIGS. 1, 3, and 4.

For example, in Block S120, the autonomous vehicle can regularly execute a test routine for each cellular network supported by the autonomous vehicle. In this example, the autonomous vehicle can: broadcast a test signal via a network antenna on the autonomous vehicle; cooperate with a corresponding remote server, cellular tower, or hub, to test latency, throughput (or bandwidth), packet loss, and/or signal strength for this cellular network; and repeat this process to retest performance of the cellular network once per ten-second interval or once per 100 meters traversed by the autonomous vehicle. In this example, the autonomous vehicle can concurrently execute this process for each other cellular network supported by the autonomous vehicle.

Similarly, the autonomous vehicle can (in cooperation with cellular towers or remote servers): test performance of wireless networks intermittently at a sequence of fixed or variable spatial intervals along a roadway; extrapolate performance of these wireless networks, such as from previous spatial intervals to a future spatial interval in this sequence of spatial intervals along the roadway in order to predict upcoming performance characteristics of wireless networks available to the autonomous vehicle; and then preemptively adjust sensitivity to remote operator events based on these predicted future wireless network performance characteristics, as described below.

In another implementation, the autonomous vehicle can access a wireless network performance map of cellular network performance (such as described below) and selectively execute test routines on these supported cellular networks at geospatial locations for which no cellular network performance data is available in the wireless network performance map or for which no cellular network performance data less than two hours old is available in the wireless network performance map. For example, during autonomous operation, the autonomous vehicle can: access the wireless network performance map; and query the wireless network performance map for availability of contemporary performance characteristics of local cellular networks recorded by other autonomous vehicles that recently traversed the autonomous vehicle's current location (e.g., within the last two hours). Then, if the wireless network performance map does contain such contemporary performance characteristics of the set of wireless networks, the autonomous vehicle can retrieve performance characteristics of these cellular networks for the autonomous vehicle's current location from the wireless network performance map directly and selectively adjust sensitivity to remote operator events accordingly. However, if the wireless network performance map excludes such contemporary performance characteristics for these cellular networks at the autonomous vehicle's current location, the autonomous vehicle can: transmit a set of test signals on these cellular networks; derive performance characteristics of these cellular networks based on transmission of these test signals; and then write these performance characteristics to the particular location in the wireless network performance map. However, the autonomous vehicle can execute a cellular network test routine according to any other schema or trigger.

Furthermore, for each cellular network tested by the autonomous vehicle in Block S120 when occupying a particular location within a geographic region, the autonomous vehicle can thus characterize a latency, throughput, packet loss, signal quality, and/or signal strength of the cellular network at the particular location. The autonomous vehicle can also: compile these cellular network characteristics into one "composite performance" metric specific to the cellular network at this particular location; repeat this process for each other cellular network tested at this particular location; and rank cellular networks at this location by their latency, throughput, packet loss, signal strength, and/or composite performance at this particular location. The autonomous vehicle can then: write these rankings and/or raw performance data to the wireless network performance map, as described above; and/or adjust sensitivities to remote operator events in real-time based on these rankings and/or raw performance data, as described below.

5.2 Performance Degradation

The autonomous vehicle can execute the foregoing methods and techniques to test or retrieve performance characteristics of various cellular networks—supported by the autonomous vehicle—and to monitor performance changes (i.e., improvement or degradation) of these cellular networks over time. As described below, the autonomous vehicle can thus increase sensitivity for remote operator events when there is a drop in performance of a best (e.g., lowest-latency, highest-throughput) cellular network, some cellular networks, or all cellular networks accessible to the autonomous vehicle (e.g., since a last test routine). Conversely, the autonomous vehicle can decrease sensitivity for remote operator events when there is an increase in performance of a best (e.g., lowest-latency, highest-throughput) cellular network, some cellular networks, or all cellular networks accessible to the autonomous vehicle (e.g., since a last test routine), as shown in FIGS. 3 and 4.

In one implementation, when the autonomous vehicle enters a first location along a roadway at a first time in Block S110, the autonomous vehicle can record a first latency, a first throughput, and a first packet loss of a first cellular network—accessible to the autonomous vehicle in this first location (e.g., exhibiting a minimum signal strength at this first location) or otherwise supported by the autonomous vehicle—in Block S120. As the autonomous vehicle traverses the roadway and enters a second location on the roadway at a second, subsequent time, the autonomous vehicle can similarly record a second latency, a second throughput, and a second packet loss of the first cellular network in Block S120. Then, if the second latency exceeds the first latency (i.e., if latency of the first cellular network has increased), if the first throughput exceeds the second throughput (i.e., if throughput of the first cellular network has diminished), and/or of the second packet loss exceeds the first packet loss (i.e., if the first cellular network is exhibiting increased packet loss), the autonomous vehicle can increase sensitivity (e.g., by decreasing a sensitivity threshold) for triggering remote operator events at the autonomous vehicle; and vice versa. The autonomous vehicle can similarly adjust the sensitivity for triggering remote operator events at the autonomous vehicle based on changes in latency, throughput, and/or packet loss of other cellular networks supported by the autonomous vehicle between the previous and current test routines.

6. Wireless Network Performance Map

In one variation shown in FIGS. 1 and 3, the autonomous vehicle also accesses a wireless network performance map that represents historical performance characteristics of wireless networks within this geographic region. For example, the wireless network performance map can be populated with cellular network performance data collected by a fleet of autonomous vehicles operating within this geographic region. The autonomous vehicle can then automatically update this wireless network performance map in Block S122 with georeferenced cellular network performance data collected by the autonomous vehicle in Block S120. In particular, in this variation, the autonomous vehicle can cooperate with other autonomous vehicles operating in the same geographic region to: collect performance data—or latency, throughput, packet loss, and/or signal strength data more specifically—of various cellular networks at locations throughout this geographic region in Block S120 while autonomously navigating along roadways (e.g., while autonomously executing ride requests) within the geographic region in Block S110; and to aggregate these cellular network performance data into a wireless network performance map that predicts cellular network performance within this geographic region, such as as a function of location, time of day, and/or traffic density, etc.

For example, as autonomous vehicles collect wireless network performance data while operating within the geographic region over time, these autonomous vehicles can upload georeferenced, timestamped wireless network performance data—including metadata for local traffic conditions (e.g., number, type, and/or density of other vehicles and pedestrians nearby) and local weather conditions—to the remote computer system. For each individual cellular network, the remote computer system can then update the wireless network performance map with these performance data, including deriving functions for latency, throughput, and packet loss as a function of time of day, local traffic conditions, and local weather conditions within each discrete road area (e.g., ten-meter-long road segments) within the geographic region.

In this variation, the autonomous vehicle can additionally or alternatively access a wireless network performance map generated from or augmented with cellular network performance data collected by mobile devices (e.g., smartphones) operating within this geographic region. (In another variation, the autonomous vehicle can similarly access a cellular network model generated from cellular network performance data collected by mobile devices operating within this geographic region over time; and the cellular network model can output cellular network performance predictions for discrete locations throughout the geographic regions based on: time of day or day of the week; current local weather or seasonal conditions; or load variations due to human movement patterns, holidays, public events, etc.)

6.1 Predictions from Wireless Network Performance Map

Later, as the autonomous vehicle enters a roadway within this geographic region, the autonomous vehicle can query this wireless network performance map for a prediction of cellular network performance within the discrete road area currently occupied by the autonomous vehicle given the current time of day, local traffic conditions detected by the autonomous vehicle, and local weather conditions. The autonomous vehicle can then adjust sensitivity to remote operator events, preemptively elect or establish wireless connectivity with select cellular networks, and/or adjust motion planning functions (e.g., reduce its road speed), etc. based on cellular network performance characteristics returned by the wireless network performance map.

6.2 Wireless Network Performance Map Normalization

In this variation, the autonomous vehicle can also normalize the wireless network performance map—which predicts current wireless network performance characteristics in light of historical wireless network performance data—based on current, measured wireless network performance data collected by the autonomous vehicle in Block S120.

In one implementation, while traversing a roadway over a first period of time, the autonomous vehicle: tests actual performance characteristics of a set of wireless networks at locations along the roadway in Block S120; and then normalizes historical performance characteristics of the set of wireless networks—along the roadway—depicted in the wireless network performance map based on actual performance characteristics of the set of wireless networks measured by the autonomous vehicle at locations along the roadway. For example, if the autonomous vehicle measures throughput of 11.2 Mbps and 8.1 Mbps and latency of 43 milliseconds and 34 milliseconds at a first location and a second location, respectively, along the roadway for a first cellular network but the wireless network performance map predicts 14.9 Mbps and 10.2 Mbps and latency of 55 milliseconds and 49 milliseconds at the first location and the second location, respectively, for the first cellular network, the autonomous vehicle can extrapolate differences between measured and predicted throughput and latency for the first cellular network to other locations nearby, including anticipating lower throughput and latency than predicted by the wireless network performance map for the first cellular network at other locations nearby. Thus, the autonomous vehicle can adjust sensitivity to remote operator events based on both measured wireless network performance characteristics at the autonomous vehicle's current location and normalized wireless network performance characteristics predicted by the wireless network performance map for future locations of the autonomous vehicle.

For example, the autonomous vehicle can implement a sensitivity function: to calculate current threshold sensitivity for the autonomous vehicle's current location proportional to measured latency and inversely proportional to throughput for all supported cellular networks at the autonomous vehicle's current location; and to calculate future threshold sensitivities for the autonomous vehicle's future locations (e.g., up to ten seconds in the future on a one-second interval) proportional to normalized latency and inversely proportional to normalized throughput predicted by the wireless network performance map for all supported cellular networks. The autonomous vehicle can then implement the highest sensitivity thus calculated for the current and upcoming locations of the autonomous vehicle. The autonomous vehicle can repeat this process regularly (e.g., on a one-second interval) to refine and elect sensitivities for triggering requests for a remote human operator to assist the autonomous vehicle.

Therefore, the autonomous vehicle can preemptively increase sensitivity (e.g., by decreasing the sensitivity threshold) for triggering remote operator events at the autonomous vehicle in response to normalized historical performance characteristics of wireless networks—represented in the wireless network performance map and accessible—predicting performance degradation in the set of wireless networks in an upcoming location of the autonomous vehicle along the roadway. Conversely, the autonomous vehicle can decrease sensitivity (e.g., by increasing the sensitivity threshold) for triggering remote operator events at the autonomous vehicle in response to measuring performance improvement in the set of wireless networks directly (and in response to normalized historical performance characteristics of the set of wireless networks represented in the wireless network performance map predicting that such performance improvements will persist at future locations of the autonomous vehicle along the roadway).

7. Real-Time Cellular Network Performance Handling

Block S130 of the method S100 recites, in response to degradation of the set of cellular networks, decreasing a threshold for triggering remote operator events at the autonomous vehicle. Generally, in Block S130, the autonomous vehicle can dynamically adjust a) its sensitivity to initiating a remote operator event, b) allocation of distinct cellular networks to carry sensor data to a remote server, and/or c) motion planning functions, etc. in real-time based on local changes in performance of some or all cellular networks proximal the autonomous vehicle.

In one example, the autonomous vehicle records a first latency and a first throughput of a first cellular network and records a second latency and a second throughput of a second cellular network at a first location while traversing a roadway at a first time. Accordingly, the autonomous vehicle can set a first threshold—for triggering remote operator events at the autonomous vehicle proximal the first location—inversely proportional to a combination (e.g., an average or a maximum) of the first latency and the second latency and proportional to a second combination (e.g., an average or a maximum) of the first throughput and the second throughput of the first and second cellular networks at the first location. Later, the autonomous vehicle records a third latency and a third throughput of the first cellular network and records a fourth latency and a fourth throughput of the second cellular network at a second location along the roadway at a second time. Then, in Block S130, the autonomous vehicle can set a second threshold—for triggering remote operator events at the autonomous vehicle proximal the second location—inversely proportional to a third combination of the third latency and the fourth latency and proportional to a fourth combination of the third throughput and the fourth throughput. In this example, if the first latency combination is less than the third latency combination and if the fourth throughput combination is less than the second throughput combination, the autonomous vehicle can set the second threshold less than the first threshold, thereby increasing sensitivity of the autonomous vehicle to top events from the first location to the second location responsive to a decrease in aggregate latency and throughput performance of the first and second cellular networks between the first and second locations.

In another example, the autonomous vehicle can implement similar methods and techniques to test performance characteristics of multiple cellular networks at various locations along a roadway. Then, for each discrete location (or "road segment") along the roadway, the autonomous vehicle can set a threshold—for triggering remote operator events at the autonomous vehicle proximal the discrete location (or road segment) along this roadway—proportional to a quantity of wireless networks that exhibit latencies less than a threshold latency and that exhibit throughputs greater than a threshold throughput. The autonomous vehicle can repeat this process in (near) real-time for each discrete location (or road segment) along the roadway thus entered by the autonomous vehicle during autonomous operation.

7.1 Sensitivity Adjustment

As shown in FIGS. 1, 3, and 4, as local cellular network performance decreases, the autonomous vehicle increases sensitivity (or "decreases a sensitivity threshold") to environment and/or perception conditions that trigger remote operator events; and vice versa. For example, the autonomous vehicle can increase a minimum threshold confidence for types or trajectories of external objects output by a perception pipeline executed on the autonomous vehicle responsive to degradation of performance of one or multiple cellular networks in the autonomous vehicle's location; then, if the perception pipeline fails to predict a type or trajectory of every object near the autonomous vehicle or near the autonomous vehicle's path near this location with more than this minimum threshold confidence, the autonomous vehicle can trigger a remote operator event. In a similar example, the autonomous vehicle can increase a minimum threshold confidence for right of way responsive to degradation of performance of one or multiple cellular networks in the autonomous vehicle's location; then, if the perception pipeline fails to identify an object (e.g., the autonomous vehicle, another vehicle, a pedestrian) with right of way near this location with more than this minimum threshold confidence, the autonomous vehicle can trigger a remote operator event. Therefore, as performance of one or more cellular networks proximal the autonomous vehicle decreases, the autonomous vehicle can increase sensitivity to lower-confidence situations and thus selectively trigger remote operator events sooner as such lower-confidence situations develop around the autonomous vehicle, thereby enabling remote operators to access sensor data depicting these lower-confidence situations sooner and thus enabling these remote operators to return timely navigational actions for the autonomous vehicle with greater accuracy.

In one example described above, the autonomous vehicle calculates confidence scores for: object types identified in a scene nearby (e.g., whether the autonomous vehicle is confident that a detected object represents a pedestrian and not a fire hydrant); a context of the scene (e.g., whether the autonomous vehicle has right of way to enter an intersection and that a pedestrian is not occupying a crosswalk ahead of the autonomous vehicle); and/or viability of a trajectory calculated by the autonomous vehicle to maintain the autonomous vehicle on a preplanned path and/or avoid collision with another vehicle. The autonomous vehicle can also implement: a nominal threshold confidence score for detecting objects; a nominal threshold confidence score for perceiving the scene around the autonomous vehicle; and/or a nominal threshold confidence score for validating its trajectory. When local cellular network performance is optimum (e.g., supports upload of all relevant sensor data to a remote operator with less than a threshold latency and less than a threshold packet loss), the autonomous vehicle can query a remote operator for assistance when object detection, scene perception, and/or trajectory validation scores calculated by the autonomous vehicle drop below corresponding nominal threshold confidence scores, such as repeatedly over a prescribed duration of time (e.g., one second). In this example, by implementing these nominal threshold confidence scores when performance of one or more local cellular networks is high (or "optimal"), such cellular networks may enable a remote operator portal to access a remote operator request and rich sensor data (e.g., a high-resolution color video feed and/or a depth map feed) from the autonomous vehicle with low latency and low packet loss. Thus, under such conditions, the autonomous vehicle can leverage low-latency, high-throughput, and low-loss characteristics of this cellular network to delay requesting assistance from a remote operator until need for such assistance is imminent without (substantially) sacrificing the quality or speed with which the remote operator is presented sensor data from the autonomous vehicle, comprehends the scene around the autonomous vehicle based on these sensor, and returns a navigational action or other command to the autonomous vehicle.

However, when cellular network performance diminishes, local cellular networks may no longer support rapid, low-loss delivery of sensor data from the autonomous vehicle to the remote operator portal. Rather, sensor data transmitted by the autonomous vehicle via these lower-performance cellular networks may reach the remote operator portal with some measurable latency (or "lag"), and/or some of these sensor data may never reach the remote operator portal due to lossiness of these local cellular networks. Furthermore, to compensate for such latency and better ensure that at least some sensor data timely reaches a remote operator portal, the autonomous vehicle may compress these sensor data or elect to transmit lower-resolution sensor data to the remote operator portal. Such cellular network performance degradation may therefore reduce a speed with which a remote operator may view and comprehend the scene depicted in sensor data received from the autonomous vehicle during a remote operator event and thus reduce a speed with which the remote operator may return assistance to the autonomous vehicle (e.g., by electing or confirming a next navigational action for the autonomous vehicle or by assuming remote manual control of the autonomous vehicle). To compensate for such degraded cellular network performance, the autonomous vehicle can thus increase threshold confidence scores that the autonomous vehicle must achieve for object identification, scene perception, trajectory validation, and/or right of way detection in order to continue operating autonomously, thereby increasing sensitivity to possible remote operator events under such cellular network conditions.

Thus, as cellular network performance decreases, the autonomous vehicle can increase minimum threshold confidence scores for object detection, scene perception, trajectory validation, and/or right of way detection. Then, when the autonomous vehicle's confidence in its detection of an object, perception of its environment, validation of its trajectory, or determination of right of way falls below corresponding minimum threshold confidence scores, the autonomous vehicle can: initiate a remote operator event; prompt a remote operator to intervene in the autonomous vehicle's navigation; serve sensor data to this remote operator; and execute a navigational action subsequently received or confirmed by the remote operator.

7.2 Example: Object Type

Therefore, in this foregoing implementation, the autonomous vehicle can set a low threshold (e.g., low sensitivity) for triggering remote operator events at the autonomous vehicle proximal a first location along a roadway responsive to local wireless networks exhibiting a high aggregate performance—as measured directly by the autonomous vehicle or indicated in the wireless network performance map—at the first location. The autonomous vehicle can concurrently: record a first depth map representing surfaces within a first scene proximal the autonomous vehicle at the first location via depth sensors arranged on the autonomous vehicle; detect a first set of objects in the first scene based on the first depth map; calculate a confidence score for a type of each object in this first set of objects; elect a first navigational action based on types and locations of the first set of objects in the first scene and a predefined route assigned to the autonomous vehicle; and then autonomously execute the first navigational action to navigate toward a second location (e.g., if confidence scores for types of the first set of objects exceeds the first threshold).

Subsequently, the autonomous vehicle can set a second, greater threshold for triggering remote operator events at the autonomous vehicle proximal the second location in response to wireless networks exhibiting a second, lower aggregate performance at the second location. Concurrently, the autonomous vehicle can: record a second depth map representing surfaces within a second scene proximal the autonomous vehicle at the second location; detect a second set of objects in the second scene based on the second depth map; calculate a confidence score for each object in the second set of objects; elect a second navigational action based on types and locations of the first set of objects in the second scene and the predefined route assigned to the autonomous vehicle; and autonomously execute the second navigational action. Furthermore, at the second location, the autonomous vehicle can trigger a remote operator event at the second time and begin streaming sensor data to a remote operator portal if a confidence score for a type of any one object in the second set of objects falls below the second threshold—even if the autonomous vehicle is still operating autonomously and not yet in need of direct assistance from a remote operator.

In particular, the autonomous vehicle can initially transmit a request for passive review of the autonomous vehicle and transmit a first sequence of scan data (e.g., color images) to a remote computer system for distribution to a remote operator during an initial period of this remote operator event. A remote operator portal thus assigned to the autonomous vehicle may then render this first sequence of scan data—such as with video feeds received from other autonomous vehicles in which remote operator events are similarly active—for passive review by a corresponding remote operator. As the autonomous vehicle executes the second navigational action and moves toward a third location while the remote operator event at the autonomous vehicle remains active, the autonomous vehicle can repeat the foregoing methods and techniques, including: recording a third depth map representing surfaces within a third scene proximal the autonomous vehicle at the third location; detect a third set of objects in the third scene based on the third depth map; and calculate a confidence score for each object in the third set of objects. If confidence scores for types of each of these objects exceeds a third threshold calculated for this third location, the autonomous vehicle can disable the current remote operator period. Alternatively, if the confidence score for a type of one of these objects falls below this third threshold, the autonomous vehicle can continue to stream sensor data to the remote operator portal for passive review by the remote operator. Yet alternatively, if a confidence score for a type of object in the second set of objects falls below a disengagement threshold (less than the third threshold set for the third location), the autonomous vehicle can: automatically cease autonomous operation; transmit a request for active remote control of the autonomous vehicle to the remote computer system; and transmit a second sequence of sensor data to the remote operator portal. Accordingly, the remote operator portal can: render the second sequence of color images exclusive of video feeds received from other autonomous vehicles; record a navigational command entered by the remote operator at the remote operator portal; and return this navigational command to the autonomous vehicle. The autonomous vehicle can then execute this navigational action in order to move past the third location before resuming autonomous operation.

Therefore, the autonomous vehicle and the remote operator (and/or the remote computer system) can cooperate: to suppress or disable transmission of sensor data from the autonomous vehicle to the remote operator when systems executing on the autonomous vehicle perceive the scene around the autonomous vehicle with high confidence (relative to a threshold set by current cellular network performance); to serve sensor data from the autonomous vehicle to the remote operator in a low-priority format (e.g., for "passive review" with sensor feeds from other autonomous vehicles) when systems executing on the autonomous vehicle perceive the scene around the autonomous vehicle with moderate confidence (relative to a threshold set by current cellular network performance); and to serve sensor data from the autonomous vehicle to the remote operator in a high-priority format (e.g., for "active review" exclusive of sensor feeds from other autonomous vehicles) when systems executing on the autonomous vehicle perceive the scene around the autonomous vehicle with low confidence (relative to a threshold set by current cellular network performance).

7.3 Example: Object Trajectory

The autonomous vehicle can implement similar methods and techniques to selectively return sensor data, request passive review, and/or request active assistance to a remote operator portal based on confidence scores calculated for predicted trajectories of objects near the autonomous vehicle (e.g., based on locations objects depicted in a current and depth map and a sequence of preceding depth maps).

7.4 Example: Right of Way

Additionally or alternatively, the autonomous vehicle can implement similar methods and techniques to selectively return sensor data, request passive review, and/or request active assistance to a remote operator portal based on confidence scores for retention of right of way—to navigate through a roadway—by the autonomous vehicle (e.g., based on types, locations, and trajectories of objects detected in depth maps and/or color images of the scene around the autonomous vehicle).

8. Remote Operator Interaction

The autonomous vehicle can also prompt different types of remote operator interactions with the autonomous vehicle based on wireless network signal quality proximal the autonomous vehicle. In one example, when the autonomous vehicle confirms "near-optimal" wireless network quality and detects a remote operator event condition at its current location, the autonomous vehicle can transmit a request to a remote operator to assume remote manual control of steering inputs at the autonomous vehicle and broadcast LIDAR and/or video feeds to the remote operator portal via these local cellular networks, which may support such low-latency data transfer from the autonomous vehicle. However, if the autonomous vehicle detects a remote operator event condition in a location in which the autonomous vehicle has also detected poor cellular network performance, the autonomous vehicle can instead transmit—to a remote operator portal—a compressed video and a request for the remote operator to select either a "stop" or a "go" function for the autonomous vehicle.

However, the autonomous vehicle can implement any other method or technique to increase sensitivity to remote operator event conditions responsive to degradation of performance of one or more cellular networks at the autonomous vehicle's location in Block S130.

Furthermore, the autonomous vehicle can regularly repeat this process to dynamically readjust sensitivity to remote operator event conditions in Block S130, such as in real-time following each cellular network test in Block S120.

9. Data Allocation

In another implementation shown in FIGS. 1 and 4, the autonomous vehicle pre-allocates sensor data types for transmission from the autonomous vehicle over select cellular networks during current or possible future remote operator events based on current performance of these cellular networks.

In one example, the autonomous vehicle assigns greatest priority to video feeds recorded by forward, left-forward, and right-forward cameras arranged on the autonomous vehicle. In this example, after testing cellular networks in Block S120, the autonomous vehicle can: identify a subset of cellular networks that exhibit sufficient upload throughput for these forward, left-forward, and right-forward video feeds while also maintaining packet loss under 2.5%; and allocate a first cellular network—in this subset of cellular networks—that exhibits a lowest latency to carry these video feeds. Upon subsequently initiating a remote operator event, the autonomous vehicle can thus enable a remote operator to view 2D color video of a scene to the right-front, front, and left-front of the autonomous vehicle with minimum latency. In this example, the autonomous vehicle can also elect a second cellular network—exhibiting smallest latency and lowest lossiness regardless of throughput—for downloading a command or control inputs from a remote operator portal in order to minimize a time from entry of a command at the remote operator portal to receipt and execution of this command by the autonomous vehicle.

In another example, when the autonomous vehicle is preparing to turn right at an intersection, the autonomous vehicle can: assign greatest priority to a left video feed recorded by a left-facing camera on the autonomous vehicle; identify a subset of cellular networks that exhibit sufficient upload throughput for a video feed from the left-facing camera while also keeping packet loss under 2.5%; allocate a first cellular network—in this subset of cellular networks—exhibiting lowest latency to carry the left video feed, thereby ensuring this highest priority video feed reaches a remote operator with minimum latency and maximum resolution during a subsequent remote operator event, which may improve the speed and quality of the remote operator's response. In this example, the autonomous vehicle can also: assign a second priority to a forward video feed recorded by a forward-facing camera on the autonomous vehicle; and allocate a second cellular network—in this subset of cellular networks—exhibiting second lowest latency to carry the forward video feed. During the subsequent remote operator event, the autonomous vehicle can thus enable the remote operator to view a scene ahead of the autonomous vehicle—such as an opposing left turn lane ahead of the autonomous vehicle—at high resolution and with slightly greater latency, which may enable the remote operator to determine whether to trigger the autonomous vehicle to execute a right turn into the intersection.

However, in the foregoing examples, if the autonomous vehicle determines that no cellular network exhibits less than a threshold packet loss rate (e.g., 5%), then the autonomous vehicle can select two distinct cellular networks—in a set of cellular networks available to the autonomous vehicle in its current location—that in combination may yield less than the threshold packet loss rate; the autonomous vehicle can then upload identical sensor data—of the highest-priority type (e.g., left-forward, forward, and right-forward color video feeds)—to the remote server via both of these cellular networks. In particular, the autonomous vehicle can upload identical data via two distinct cellular networks, and the remote server or the remote operator portal can recombine these data into a more complete, less lossy video feed(s) in order to compensate for poor performance across multiple local cellular networks and in order to achieve improved real-time playback characteristics of these sensor data at the remote operator portal during a remote operator event.

In a similar example, the autonomous vehicle records latencies and throughputs of a first, second, and third cellular network while traversing a roadway. Then, if the first cellular network exhibits both greater latency and greater throughput than the second and third cellular networks, the autonomous vehicle can allocate a depth map feed to the first cellular network, thereby increasing probability that such high-resolution sensor data reaches a remote operator with limited buffering or interruption (despite some lag) during a current or possible future remote operator event. Similarly, if the third cellular network exhibits a latency less than the first and second cellular networks but also a limited throughput, the autonomous vehicle can allocate the third cellular network to receive navigational commands from a remote operator assigned to assist the autonomous vehicle throughout the current or possible future remote operator event, thereby supporting fastest receipt and execution of a navigational command once entered by the remote operator at her remote operator portal. Furthermore, in this example, because the second cellular network exhibits lower latency than the first cellular network and greater throughput that the third cellular network, the autonomous vehicle can allocate a color video feed to the second cellular network, thereby ensuring that a continuous stream of at least some moderate-resolution sensor data timely reaches the remote operator during the current or possible future remote operator event. Once the autonomous vehicle triggers a remote operator event, the autonomous vehicle can also adjust resolution of depth map and color video feeds broadcast on the first and second cellular networks to compensate for real-time performance characteristics of these cellular networks, such as by compressing frames in these feeds or by dropping select frames (e.g., every other frames) in these feeds in order to reduce throughput requirements for uploading these feeds to a remote operator portal.

10. Data Upload Duration

Furthermore, in a scenario in which the autonomous vehicle increases sensitivity to remote operator events responsive to detecting reduced cellular network performance, the autonomous vehicle may initiate broadcast of compressed sensor data to a remote operator earlier in the course of a remote operator event, thereby providing the remote operator more time to perceive and comprehend the scene around the autonomous vehicle from these higher-compression (e.g., lower-resolution) sensor data, thereby reducing the remote operator's perception latency when the autonomous vehicle requires a final response from the remote operator, which may enable the remote operator to provide timely assistance to the autonomous vehicle despite reduced local cellular network performance. Conversely, in a scenario in which the autonomous vehicle decreases sensitivity to remote operator events responsive to detecting increased cellular network performance, the autonomous vehicle may initiate broadcast of compressed sensor data to a remote operator later in the course of a remote operator event, thereby providing the remote operator with less time to perceive and comprehend the scene around the autonomous vehicle. However, these higher-resolution (e.g., lower-compression) sensor data may enable the remote operator to more quickly perceive the scene around the autonomous vehicle and provide a rapid response to the autonomous vehicle, thereby reducing during of sensor data transmission from the autonomous vehicle to the remote operator portal, limiting volume and duration of transmitted data, and reducing net operating costs for the autonomous vehicle.

11. Navigation and Motion Planning

In another implementation, the autonomous vehicle modifies motion planning or autonomous navigation characteristics based on local cellular network performance, such as by reducing a maximum absolute or relative speed of the autonomous vehicle as local cellular network performance degrades.

In one example shown in FIG. 1, as latency increases for cellular networks around the autonomous vehicle, the autonomous vehicle can reduce its speed (e.g., by 20% or 10 mph) in order to decrease a distance traversed by the autonomous vehicle over a period of time from transmission of sensor data by the autonomous vehicle to receipt of these sensor data at a remote operator portal, thereby reducing impact of this increased latency. In this example, for each 0.01-second increase in latency—averaged over a period of time such as thirty seconds—the autonomous vehicle can reduce its maximum speed by 10%.

Therefore, in this implementation, the autonomous vehicle can query the wireless network performance map for historical performance characteristics local wireless networks or measure actual performance characteristics of these local wireless networks when entering a roadway. Then, if the wireless network performance map returns a prediction of degraded performance across these local wireless networks or if the autonomous vehicle detects such degradation directly, the autonomous vehicle can automatically modify its path planning and autonomous navigation parameters accordingly, such as including automatically reducing its top permitted speed and/or reducing its current speed.

12. Predefined Remote Operator Locations

In one variation, the autonomous vehicle accesses a wireless network performance map annotated with predefined remote operator event locations with a geographic region, such as at railroad crossings, in school zones, or at difficult unprotected left turn lanes. While navigating autonomously within the geographic region, the autonomous vehicle can automatically initiate a remote operator event upon approaching a predefined remote operator event location or segment of roadway.

In this variation, the autonomous vehicle can dynamically adjust a distance from an upcoming predefined remote operator event location at which the autonomous vehicle initiates a remote operator event based on local cellular network performance. For example, as performance of one or more cellular networks degrades as the autonomous vehicle approaches a predefined remote operator event location, the autonomous vehicle can increase a trigger distance from this remote operator event location at which the autonomous vehicle will submit a request for assistance from a remote operator; and vice versa. The autonomous vehicle can thus initiate a remote operator event at a distance—from a predefined remote operator event location—that increases with decreasing local cellular network performance.

The autonomous vehicle can thus compensate for cellular network degradation by initiating a remote operator event sooner as the autonomous vehicle approaches a predefined remote operator event location.

12. Remote Operator Event

The autonomous vehicle can therefore regularly implement the foregoing methods and techniques to: test local performance of cellular networks hosted by various cellular carriers and supported by the autonomous vehicle: adjust sensitivity to initiating a remote operator event (i.e., submitting a request for remote operator assistance and transmitting supporting sensor data to a remote operator portal) based on local performance of these cellular networks; adjust types of remote vehicle control enabled for a remote operator during a remote operator event (e.g., full steering control under high network performance conditions and binary navigational control control under poor network performance conditions); reallocate select cellular networks to carry certain sensor data during a remote operator event based on local performance of these cellular networks; and/or to test for remote operator event conditions; etc., as shown in FIG. 1.

Subsequently, when the autonomous vehicle detects a remote operator event condition—such as if the autonomous vehicle's confidence in its next action or confidence in its perception of its environment drops below a dynamic threshold set by the autonomous vehicle based on local cellular network performance, as described above—the autonomous vehicle can automatically transmit a request to a remote server for remote operator assistance in Block S140, as shown in FIGS. 1-4. The autonomous vehicle can also automatically upload select sensor data streams to the remote server in Block S142, such as over cellular networks selectively allocated to the sensor types as described above. During this remote operator event, the autonomous vehicle can remain stopped, maintain its current trajectory, or decelerate to a stop while awaiting election of a net navigational action by a remote operator assigned to the autonomous vehicle or while awaiting remote manual control by the remote operator. After executing the navigational action or command issued by the remote operator in Block S150, the autonomous vehicle can return to autonomous navigation along its assigned path.

In one variation, many autonomous vehicles operating within a geographic region can implement this process to selectively initiate remote operator events, and the remote server can distribute and rank these sensor feeds within a remote operator portal based on a perceived need of each of these autonomous vehicles for human assistance. The remote operator can thus view sensor feeds from multiple (e.g., two, ten) autonomous vehicles that may be in need of assistance simultaneously and gain some perspective regarding scenes around these autonomous vehicles, even if these sensor feeds are compressed or lagging. As a need for human assistance increases for one of these autonomous vehicles, the remote operator portal can re-rank these sensor feeds to enable the remote operator to focus her attention to sensor feeds from higher-risk autonomous vehicles. Once a need for human assistance is confirmed for a particular autonomous vehicle, the remote operator portal can expand a corresponding sensor feed and activate remote manual control of the particular autonomous vehicle via the remote operator portal.

Therefore, in this variation, autonomous vehicles throughout a geographic region can dynamically adjust thresholds for triggering remote operator events based on local cellular network performance and can selectively upload sensor feeds to the remote server for human assistance based on these thresholds; by rendering sensor feeds from several of these autonomous vehicles within one remote operator portal and ranking these sensor feeds by perceived need, the remote operator portal can enable the remote operator to monitor sensor feeds from multiple autonomous vehicles—even if these sensor feeds are compressed, lossy, or lagging—over extended periods of time, which may further enable the operator to quickly transition into controlling or entering a command for individual autonomous vehicles in need of assistance.

13. Rerouting

Autonomous vehicles can regularly test cellular network performance in Block S120 while autonomously navigating within a geographic region over time in Block S110 and can upload these timestamped, georeferenced cellular network performance data to a remote server. The remote server can compile these cellular network performance data into a wireless network performance map (or a model) of cellular network performance, such as: latency, throughput, packet loss, and/or signal strength; as functions of time of day, day of week, local traffic conditions, local weather conditions, and/or local events (e.g., concerts, professional sporting events), etc.

An autonomous vehicle autonomously navigating along a preplanned path within the geographic region can then reference this wireless network performance map (or model) to predict cellular network performance along this preplanned path and to preemptively set sensitivities to remote operator event conditions, allocate cellular networks to carry sensor data during remote operator events, and/or adjust motion planning functions based on predicted cellular network performance along the preplanned path.

Therefore, in this variation, the autonomous vehicle can reference a wireless network performance map (or model)—generated from results of cellular network performance tests performed by various autonomous vehicles operating within a geographic region over time—to predict performance of various cellular networks along its preplanned path and to preemptively execute methods and techniques described above in order to compensate for predicted cellular network performance degradation during possible remote operator events along this preplanned path.

In particular, the autonomous vehicle can compensate for cellular network degradation by automatically rerouting itself to a different path over which cellular network connectivity for one or more carriers may be available. For example, as described above, the autonomous vehicle can access a fixed or dynamic geospatial model of cellular network performance throughout the geospatial region. In this example, in response to detecting local cellular network degradation, the autonomous vehicle can query the model for a nearby location in which greater cellular network performance is predicted to occur and then automatically reroute itself toward this location. The autonomous vehicle can additionally or alternatively query nearby autonomous vehicles for their current or recent cellular network connectivities and selectively navigate toward locations at which these other autonomous vehicle detected greater cellular network performance. The autonomous vehicle can therefore dynamically reroute itself based on predicted or recently-measured cellular network connectivity.

However, the autonomous vehicle can implement Blocks of the method S100 to leverage other existing cellular network performance data and/or cellular network performance data collected by the autonomous vehicle in (near) real-time in order to compensate for cellular network performance degradation during remote operator event in any other way.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for requesting remote operator assistance, the method comprising:
   autonomously navigating along a roadway;
   at locations along the roadway, testing a performance of a set of wireless networks;
   in response to degradation of the performance of the set of wireless networks, decreasing a sensitivity threshold for triggering remote operator events at the autonomous vehicle;
   in response to an operational parameter of the autonomous vehicle exceeding the sensitivity threshold at a particular location along the roadway, triggering a remote operator event;
   during the remote operator event, transmitting sensor data to a remote computer system via at least one wireless network in the set of wireless networks based on the performance of the set of wireless networks proximal the particular location; and
   executing a command received from a remote operator via one or more of the wireless networks in the set of wireless networks.

2. The method of claim 1, wherein the performance of the set of wireless is tested based on a first latency, a first throughput, and a first packet loss of a first cellular network and a second latency, a second throughput, and a second packet loss of the first cellular networks, the sensitivity threshold for triggering remote operator events at the autonomous vehicle being decreased in response to at least one of: the second latency exceeding the first latency; the first throughput exceeding the second throughput; or the second packet loss exceeding the first packet loss.

3. The method of claim 1, wherein the performance of the set of wireless networks is tested based on: a first latency and a first throughput of a first cellular network recorded at a first time; a second latency and a second throughput of a second cellular network recorded at the first time; a third latency and a third throughput of the first cellular network recorded at a second time; and a fourth latency and a fourth throughput of the second cellular network recorded at the second time; and
   wherein decreasing the sensitivity threshold includes setting a first threshold and a second threshold, the first threshold being inversely proportional to a first combination of the first latency and the second latency and proportional to a second combination of the first throughput and the second throughput, the second threshold being inversely proportional to a third combination of the third latency and the fourth latency and proportional to a fourth combination of the third throughput and the fourth throughput, the first combination being less than the third combination, the fourth combination being less than the second combination, and the second threshold being less than the first threshold.

4. The method of claim 1
   wherein decreasing the sensitivity threshold includes setting a first threshold and a second threshold, the first threshold being proportional to a first quality of wireless networks exhibiting latencies less than a threshold latency and throughputs greater than a threshold throughput, the second threshold being proportional to a second quantity of wireless networks exhibiting latencies less than the threshold latency and throughputs greater than the threshold throughput, the first quantity being greater than the second quantity, and the second threshold being less than the first threshold.

5. The method of claim 1, wherein transmitting the sensor data to the remote computer system during the remote operator event comprises:
   in response to a first throughput of a first wireless network exceeding a second throughput of a second wireless network, transmitting a sequence of depth maps to the remote computer system via the first wireless network during the remote operator event; and
   in response to a first latency of a first wireless network exceeding a second latency of a second wireless network, transmitting a sequence of color images to the remote computer system via the first network during the remote operator event.

6. The method of claim 5, wherein when the first latency and the second latency exceed a third latency of a third wireless network, the command from the remote operator is received via the third wireless network.

7. The method of claim 1, wherein transmitting the sensor data to the remote computer system during the remote operator event comprises:
   in response to a throughput of a particular network in the set of wireless networks exceeding a threshold throughput, transmitting a sequence of high-resolution color images to the remote computer system via the particular cellular network over a first duration of time within the remote operator event; and
   in response to throughput of all networks in the set of wireless networks falling below the threshold throughput, transmitting a sequence of compressed color images, generated based on the sequence of high-resolution color images, to the remote computer system via a subset of networks in the set of wireless networks over a second duration of time greater than the first duration of time within the remote operator event.

8. The method of claim 1, wherein the performance of the set of wireless networks is tested intermittently at a sequence of spatial intervals along the roadway and extrapolated from previous spatial intervals to a future spatial interval in the sequence of spatial intervals along the roadway.

9. The method of claim 1, wherein testing the performance of the set of wireless networks comprises:
   accessing a wireless network performance map representing historical performance characteristics of the set of wireless networks within the geographic region;
   in response to the wireless network performance map containing contemporary performance characteristics of the set of wireless networks corresponding to the particular location along the roadway, retrieving performance characteristics of the set of wireless networks at the particular location from the wireless network performance map; and
   in response to the wireless network performance map excluding contemporary performance characteristics of the set of wireless networks corresponding to the particular location along the roadway:
      transmitting a set of test signals on the set of wireless networks; and
      deriving performance characteristics of the set of wireless networks based on the set of test signals.

10. The method of claim 1,
    wherein decreasing the sensitivity threshold for triggering remote operator events
    includes changing the sensitivity threshold from a first threshold corresponding to the set of wireless networks exhibiting a first performance at a first location to a second threshold corresponding to the set of wireless networks exhibiting a second performance at a second location, the second threshold being greater than the first threshold, the remote operator event being triggered when a confidence score calculated for an object type of an object detected by the autonomous vehicle is below the second threshold.

11. The method of claim 1,
    wherein decreasing the sensitivity threshold for triggering remote operator events
    includes changing the sensitivity threshold from a first threshold corresponding to the set of wireless networks exhibiting a first performance at a first time to a second threshold corresponding to the set of wireless networks exhibiting a second performance at a second time the second threshold being greater than the first threshold, the remote operator event being triggered when a confidence score calculated for a right of way of the autonomous vehicle is below the second threshold.

12. The method of claim 1,
    wherein georeferenced network performance data of the set of wireless networks during a period of time during autonomous navigation is written to a wireless network performance map.

13. The method of claim 1, wherein adjusting the sensitivity threshold for triggering remote operator events at the autonomous vehicle along the roadway includes changing the sensitivity threshold from a first threshold corresponding to the set of wireless networks exhibiting a first performance at a first location to a second threshold corresponding to the set of wireless networks exhibiting a second performance at a second location, the second threshold being greater than the first threshold, the remote operator event being triggered when a confidence score calculated for an object type of an object detected by the autonomous vehicle is below the second threshold.

14. A method for requesting remote operator assistance, the method comprising:
autonomously navigating along a roadway within a geographic region;
accessing a wireless network performance map representing historical performance characteristics of a set of wireless networks within the geographic region;
adjusting a sensitivity threshold for triggering remote operator events at the autonomous vehicle along the roadway as a function of historical performance characteristics of the set of wireless networks, represented in the wireless network performance map, proximal the roadway;
in response to an operational parameter of the autonomous vehicle exceeding the sensitivity threshold at a particular location along the roadway, triggering a remote operator event;
during the remote operator event, transmitting sensor data to a remote computer system via a subset of wireless networks, in the set of wireless networks, based on a performance of the set of wireless networks proximal the particular location; and
executing a command received from a remote operator via one or more of the wireless networks in the set of wireless networks.

15. The method of claim 14, further comprising:
while approaching the roadway, querying the wireless network performance map for the historical performance characteristics of the set of wireless networks proximal the roadway; and
in response to the wireless network performance map returning a degradation of performance across the set of wireless networks proximal the roadway, reducing a speed of autonomous navigation upon entering the roadway.

16. The method of claim 14, further comprising:
while traversing the roadway over a first period of time, testing actual performance characteristics of the set of wireless networks at locations along the roadway; and
normalizing the historical performance characteristics of the set of wireless networks, along the roadway based on the actual performance characteristics of the set of wireless networks at locations along the roadway; and
wherein adjusting the sensitivity threshold for triggering remote operator events at the autonomous vehicle along the roadway comprises:
decreasing the sensitivity threshold for triggering remote operator events at the autonomous vehicle in response to the normalized historical performance characteristics of the set of wireless networks predicting a performance degradation in the set of wireless networks along the roadway; and
increasing the sensitivity threshold for triggering remote operator events at the autonomous vehicle in response to detecting a performance improvement in the set of wireless networks along the roadway.

17. A method for requesting remote operator assistance, the method comprising:
autonomously navigating along a roadway;
at locations along the roadway, testing performance of a set of wireless networks;
updating a wireless network performance map representing historical performance characteristics of the set of wireless networks based on wireless network performance test results at locations along the roadway;
transmitting sensor data to a remote computer system via a subset of wireless networks in the set of wireless networks based on wireless network performances predicted in the wireless network performance map, the sensor data transmitted in response to a triggering of a remote operator event, the remote operator event triggered in response to an operational parameter of the autonomous vehicle exceeding a sensitivity threshold at a particular location along the roadway; and
executing a command received from a remote operator via a wireless network in the set of wireless networks.

18. The method of claim 17:
wherein testing performance of the set of wireless networks comprises:
at a first location along the roadway occupied by the autonomous vehicle at a first time, recording a first latency, a first throughput, and a first packet loss of a first network; and
at a second location along the roadway occupied by the autonomous vehicle at a second time succeeding the first time, recording a second latency, a second throughput, and a second packet loss of the first network;
wherein updating the wireless network performance map comprises:
writing the first latency, the first throughput, and the first packet loss of the first network to the first location represented in the wireless network performance map; and
writing the second latency, the second throughput, and the second packet loss of the first network to the second location represented in the wireless network performance map.

19. One or more tangible non-transitory computer-readable storage media storing computer-executable instructions for performing a computer process on a computing system, the computer process comprising:
obtaining data corresponding to a performance of a set of wireless networks obtained at one or more locations as an autonomous vehicle autonomously navigates along a travel path;
determining whether the performance of the set of wireless networks is degraded based on the data;
decreasing a sensitivity threshold for triggering remote operator events at the autonomous vehicle along the travel path when the performance of the set of wireless networks is degraded;
triggering a remote operator event when an operational parameter of the autonomous vehicle exceeds the sensitivity threshold at a particular location along the travel path;
communicating sensor data to a remote computer system via at least one wireless network in the set of wireless networks based on the performance of the set of wireless networks and the particular location; and
receiving a command for execution by the autonomous vehicle from a remote operator via one or more of the wireless networks in the set of wireless networks.

20. The one or more tangible non-transitory computer-readable storage media of claim 19, wherein the data corresponding to the performance of the set of wireless networks includes at least one of latency, throughput, or packet loss of the set of wireless networks.

21. The one or more tangible non-transitory computer-readable storage media of claim 19, wherein the data corresponding to the performance of the set of wireless networks includes a wireless network performance map representing performance characteristics of the set of wireless networks within a geographic area corresponding to the travel path.

22. The one or more tangible non-transitory computer-readable storage media of claim 21, wherein the performance characteristics includes at least one of historical performance characteristics and contemporary performance characteristics.

23. The one or more tangible non-transitory computer-readable storage media of claim 19, wherein the data corresponding to a performance of a set of wireless networks is obtained intermittently at a sequence of spatial intervals along the travel path and extrapolated from at least one previous spatial interval to at least one future spatial interval in the sequence of spatial intervals.

24. The one or more tangible non-transitory computer-readable storage media of claim 19, wherein the operational parameter includes object detection and the remote operator event is triggered when a confidence score for an object exceeds the sensitivity threshold.

25. The one or more tangible non-transitory computer-readable storage media of claim 19, wherein the sensor data includes at least one of one or more depth maps, one or more color images, or one or more high-resolution images.

26. The one or more tangible non-transitory computer-readable storage media of claim 19, wherein the command includes decelerating, ceasing autonomous operation, active remote control, or a confirmation of an autonomous action.

27. The one or more tangible non-transitory computer-readable storage media of claim 19, wherein the sensitivity threshold is increased in response to an improvement in the performance of the set of wireless networks.

* * * * *